United States Patent

Parenzuela

[11] Patent Number: 5,944,390
[45] Date of Patent: Aug. 31, 1999

[54] ONE PIECE WHEELCHAIR WHEEL

[75] Inventor: Louis Parenzuela, St. Charles, Mo.

[73] Assignee: Graham-Field, Inc., Bay Shore, N.Y.

[21] Appl. No.: 08/980,034

[22] Filed: Nov. 26, 1997

[51] Int. Cl.$^6$ .................................................. B60B 1/02
[52] U.S. Cl. .............................. 301/58; 301/104; 152/323
[58] Field of Search .................................. 301/64.7, 104, 301/58, 5.3; 152/323, 393, 394

[56] References Cited

U.S. PATENT DOCUMENTS

| | | | |
|---|---|---|---|
| 4,444,435 | 4/1984 | Honsa | 301/64.7 |
| 4,489,955 | 12/1984 | Hamilton | 280/242 |
| 4,511,184 | 4/1985 | Schauf et al. | 301/64.7 |
| 4,593,929 | 6/1986 | Williams | 280/650 |
| 4,770,432 | 9/1988 | Wagner | 301/64.7 |
| 4,917,395 | 4/1990 | Gabriele | 280/250.1 |
| 4,926,777 | 5/1990 | Davis, Jr. | 280/250.1 |
| 4,989,920 | 2/1991 | Kauzlarich et al. | 301/64.7 |
| 5,028,065 | 7/1991 | Danecker | 152/323 |
| 5,101,536 | 4/1992 | Gabriele | 280/250.1 |
| 5,556,120 | 9/1996 | Davis | 280/304.1 |
| 5,564,793 | 10/1996 | Whiteford | 301/64.7 |
| 5,603,520 | 2/1997 | Pearce | 280/250.1 |

FOREIGN PATENT DOCUMENTS

| | | | |
|---|---|---|---|
| 3536308 | 4/1987 | Germany | 301/64.7 |

*Primary Examiner*—D. Glenn Dayoan
*Assistant Examiner*—Long Bao Nguyen
*Attorney, Agent, or Firm*—Bauer & Schaffer, LLP

[57] ABSTRACT

A unitary wheel and tire assembly for a wheelchair having an axle that includes a wheel portion and a tire portion. The wheel portion is molded from a first material and has a hub for rotative mounting to the axle of the wheelchair, a plurality of spokes extending at their innermost ends radially outwardly from the hub, and a circumferential rim connecting the plurality of spokes at their outermost ends. The circumferential rim has a radially outwardly opening annular channel extending completely therearound with a plurality of spaced-apart tabs extending radially outwardly therefrom with throughbores therethrough. The tire portion is molded from a second material onto the circumferential rim of the wheel portion, and when the second material is molten, it enters and completely fills and engages the radially outwardly opening annular channel in the circumferential rim and enters and completely fills and engages the throughbores in the plurality of spaced-apart tabs in the radially outwardly opening annular channel in the circumferential rim and completely engages and encases the plurality of spaced-apart tabs in the radially outwardly opening annular channel in the circumferential rim, and when the second material has hardened, the tire portion becomes unitary and inseparable from the wheel portion without wheel structure destruction.

21 Claims, 5 Drawing Sheets ed with a maximum of 22% regrind sold by DUPONT under the name of ZYTEL, and annealed and moisture conditioned after molding. Other suitable plastic material may be used.

ONE PIECE WHEELCHAIR WHEEL

BACKGROUND OF THE INVENTION

The present invention relates to a wheel and tire assembly. More particularly, the present invention relates to a unitary wheel hand ring assembly for a wheelchair.

The prior art teaches a wheel hand ring interlocked to form one unitary assembly. The prevailing methods, however, are to have the wheel hand ring separately molded or formed prior to assembly, after which special interlocks are necessary. In some cases, the separately formed tire requires special tooling to stretch it for its attachment to the wheel. In some other instances, the wheel is formed of metal having spokes radiating out from a hub to a rim shaped to receive a tire.

A great many of the wheel and tire assemblies are quite expensive to fabricate and require expensive tools for the manufacture thereof, as well as for effecting their assembly.

The need for an inexpensive molded type unitary wheel and hand ring assembly is quite evident. In order to forfill that need in an economical manner, it is necessary to depart from the prior art and satisfying the need for a complete unitary wheel and hand ring assembly with a rugged and inexpensive wheel and hand ring which is adapted to by integrated with the wheel so as to form a secure unitary wheel and hand ring assembly for a wheelchair wherein the hand ring cannot separate from the wheel.

Accordingly, an object of the present invention is to provide a unitary wheel and hand ring assembly for a wheelchair that avoids the disadvantages of the prior art.

Another object of the present invention is to provide a unitary wheel and hand ring assembly for a wheelchair that is simple and inexpensive to manufacture.

Still another object of the present invention is to provide a unitary wheel assembly for a wheelchair that is simple to use. These objects as well as other objects and advantages will be apparent from the following disclosure of the present invention.

SUMMARY OF THE INVENTION

Briefly stated, a unitary wheel and hand ring assembly for a wheelchair is provided. A wheel portion and hand ring are molded from a first material. The molded wheel and hand ring comprises a hub for rotative mounting to the axle of the wheelchair, a plurality of spokes extending at their innermost ends radially outwardly from the hub, a circumferential tire rim connecting the plurality of spokes at their outermost ends, and a circular hand ring connected to the spokes and offset from the tire rim. The circumferential tire rim is opened radially outwardly to define an annular channel extending completely therearound. A plurality of spaced-apart tabs extending radially outwardly from the rim with the annular channel is integrally molded with the wheel. Each of the tabs are provided with at least two throughbore. A tire is installed onto the circumferential rim of the wheel portion. The tire may be made of a second molded material, in situ with he wheel, a premolded tire manually installed, or a pneumatic tire also manually installed and inflated.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawing are briefly described as follows.

DETAILED DESCRIPTION OF THE PREFERRED EMBODIMENT

Figure 1:
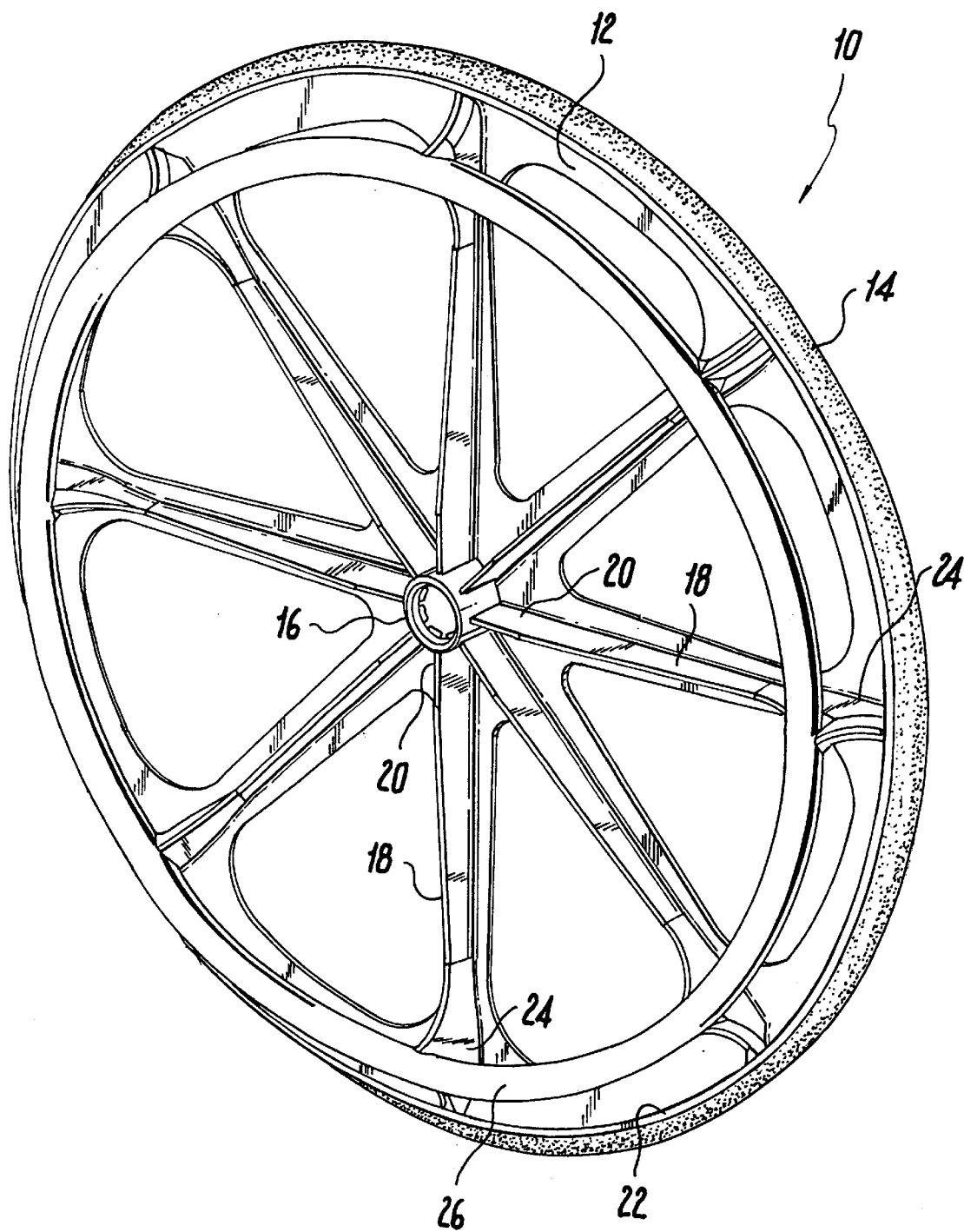
FIG. 1 is a front perspective view of the wheel of the present invention.
Figure 2:
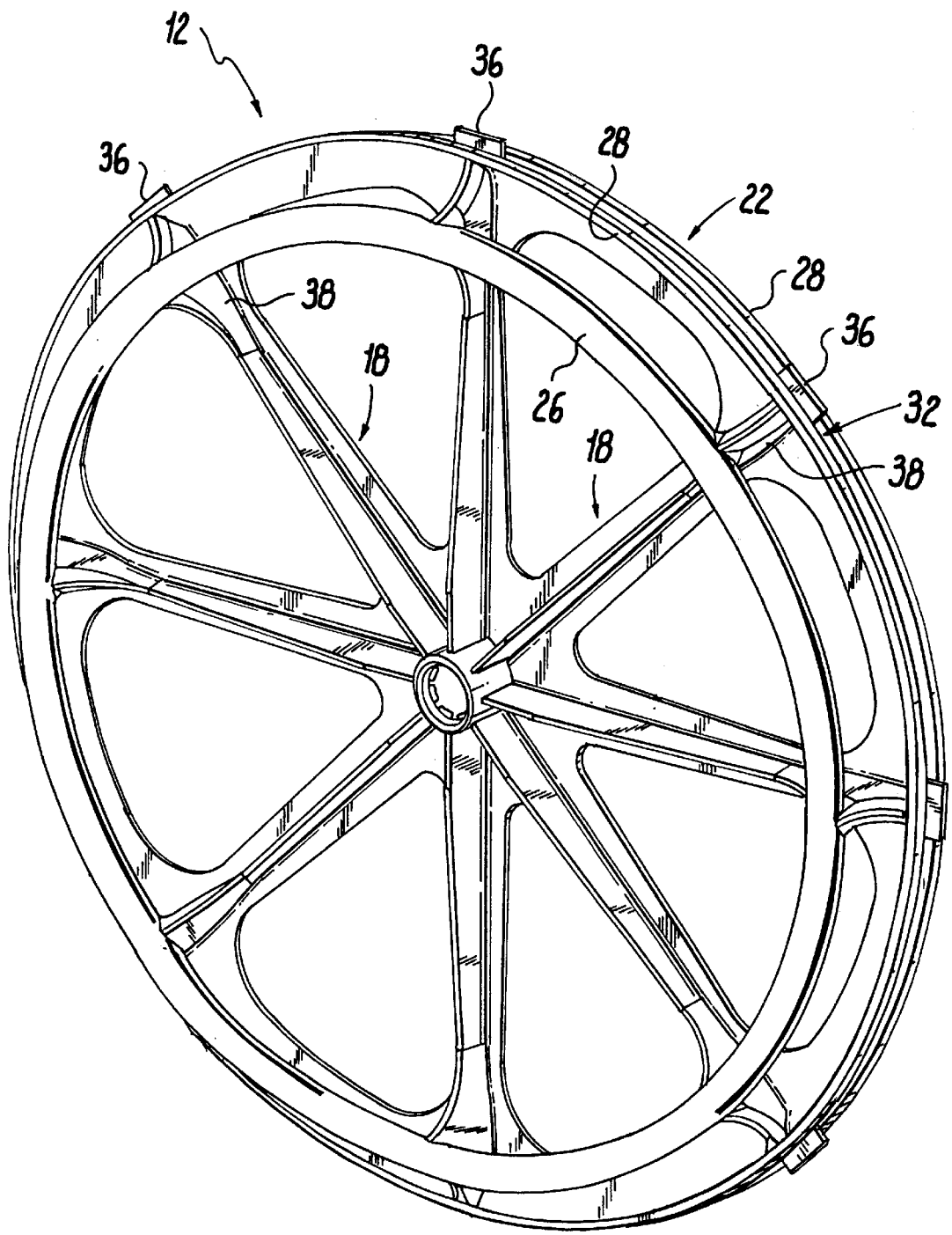
FIG. 2 is a perspective view of the wheel portion of the present invention shown in FIG. 1.
Figure 3:
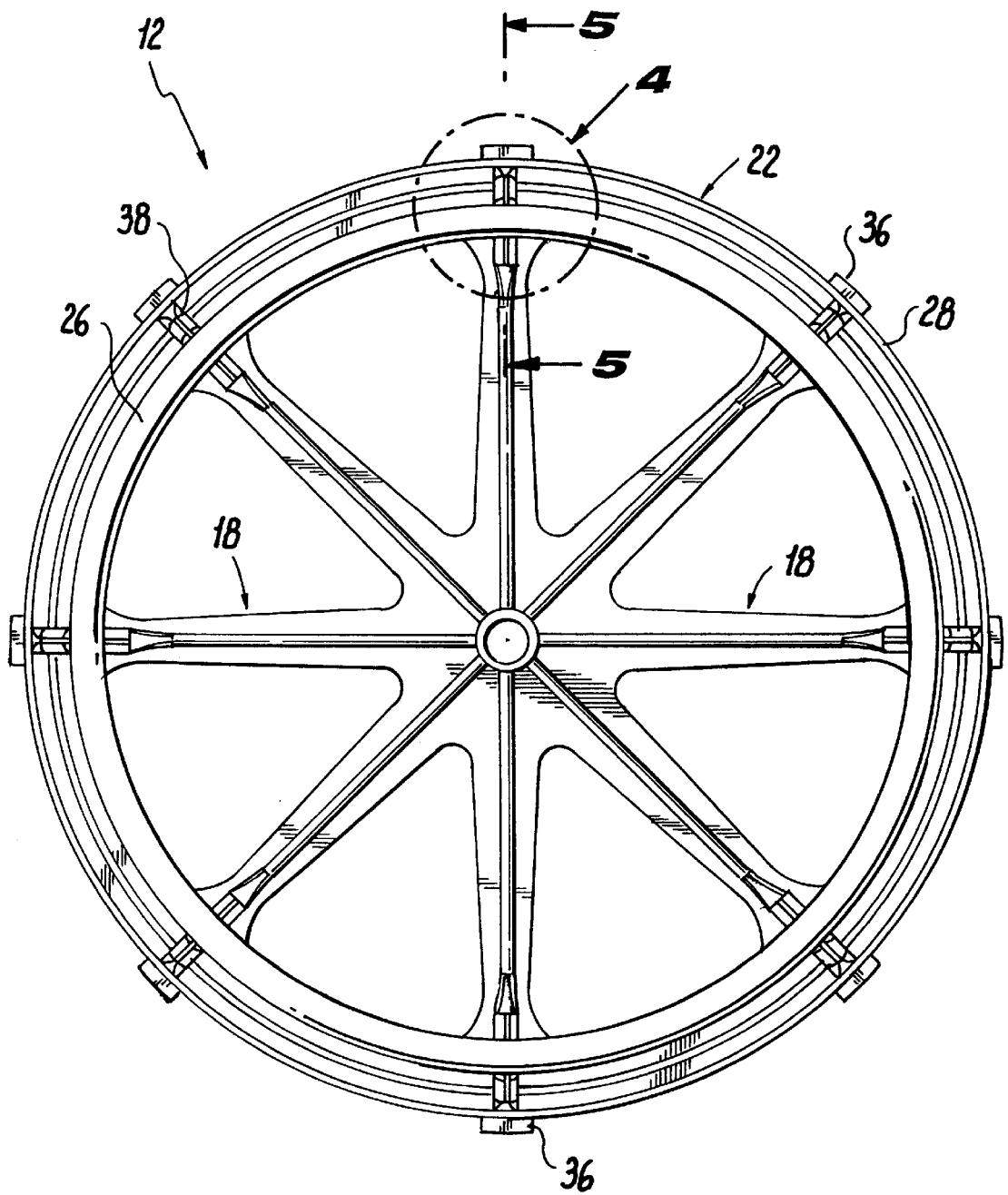
FIG. 3 is a front elevational view of the wheel portion of the present.
Figure 4:
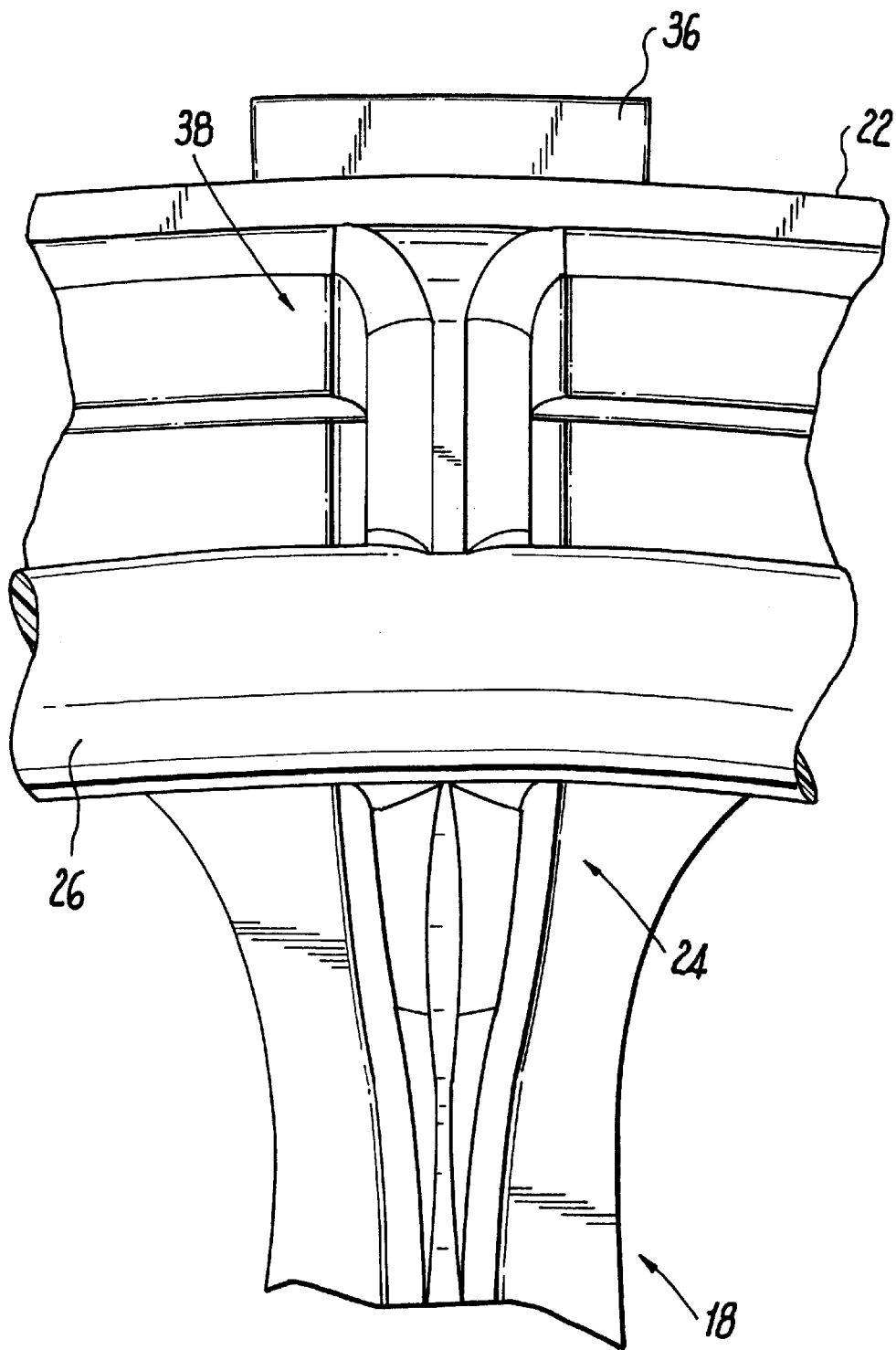
FIG. 4 is an enlarged diagrammatic front elevational view of the area generally enclosed by the dotted circle identified by arrow 4 in FIG. 3.

Referring now to the figures in which like numerals indicate like parts, and particularly to FIG. 1, the unitary wheel assembly for a wheel chair of the present invention is generally shown by the numeral 10 comprises a wheel portion 12 for rotative mounting to an axle of a wheel chair and a tire portion 14 applied onto the wheel portion 12.

The wheel portion 12 is injection molded from a first material, such as nylon with 14% glass fiber reinforced with a maximum of 22% regrind sold by DUPONT under the name of ZYTEL, and annealed and moisture conditioned after molding. Other suitable plastic material may be used. The wheel portion 12 has a hub 16 for rotative mounting to the axle of the wheelchair, a plurality of spokes 18. The spokes 18 extend at their innermost ends 20 radially outwardly from the hub 16 to a circumferential tire rim 22 that connects the plurality of spokes 18 at their outermost ends 24. A hollow push hand ring 26 that is spaced from and integrally molded with the plurality of spokes 18 is provided.

Figures 5, 6:
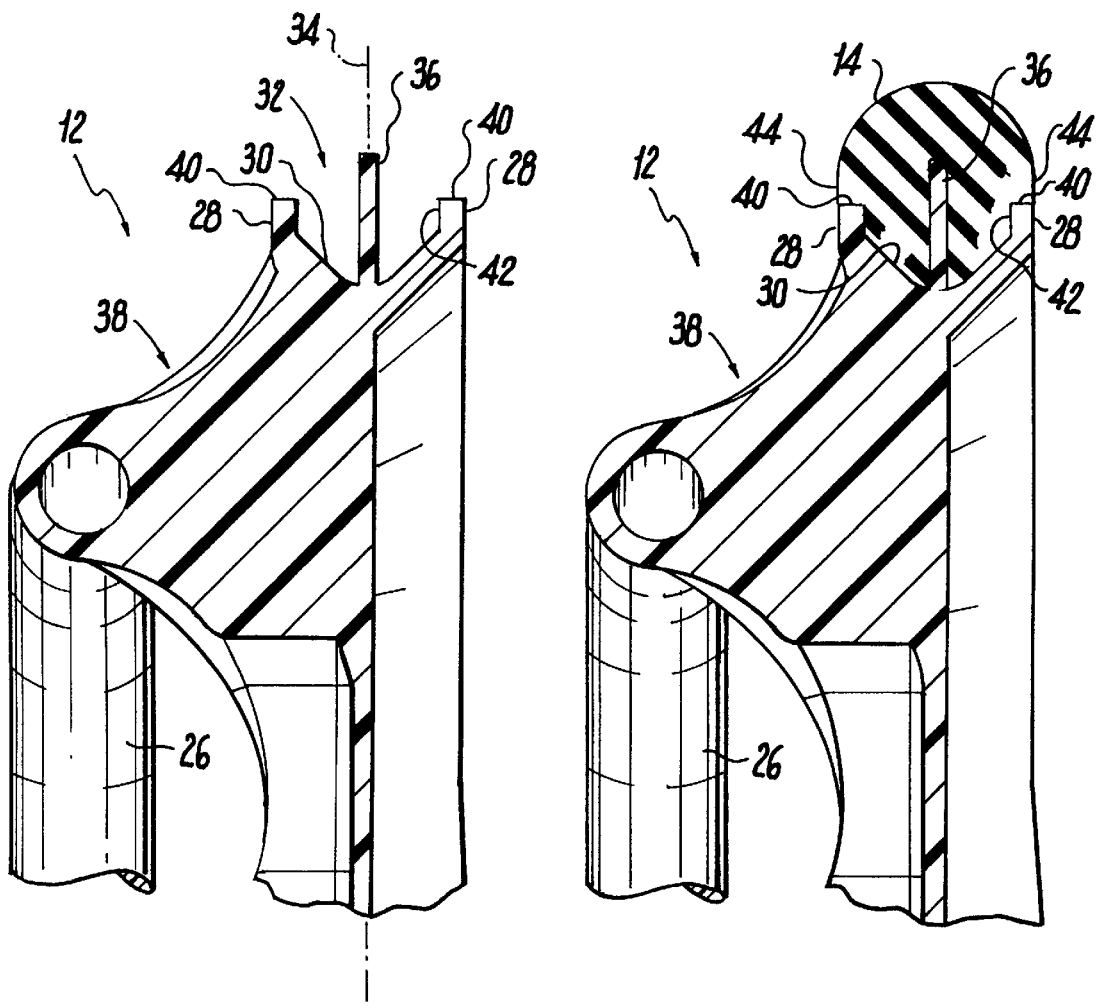
FIG. 5 is an enlarged cross sectional view taken on line 5—5 in FIG. 3, without the tire.
FIG. 6 is a view similar to FIG. 5 showing the tire in place.

As seen in FIGS. 5 and 6, the circumferential rim 22 comprises a pair of side walls 28 that are spaced-apart and annular. The walls 28 converge into an annular peripheral wall 30, forming a radially outwardly opening annular channel 32 having a central plane 34. A plurality of circumferential spaced-apart tabs 36 extend integrally from the bottom wall 30 radially outwardly therefrom. The tabs 36 may be provided, if desired, with transverse throughbores. Extending laterally from the connecting section between the spokes 18 and the circumferential tire rim 28 is a neck 38 on which the hand ring 26 is formed.

As seen in FIG. 5, the radially outwardly opening annular channel 32 in the circumferential rim 22 is substantially V-shaped in profile. The side walls 28 are provided with square shoulders 40 and a concave portion 42 so as to reduce stress and provide more surface area for the tire portion 14.

Each tab 36 of the plurality of tabs is flat, thin, and substantially rectangular shaped and extends radially outwardly from the concave portion 42 along the central plane 34 in the circumferential rim 22, in radial alignment with an associated spoke of the plurality of spokes 18. The tab 36 extends radially past the shoulder 40 to extend slightly past the opposing side walls 28. In this manner, loads imparted on the tire 14 are transmitted via the tabs 36 to the associated spokes 18.

Figure 7:
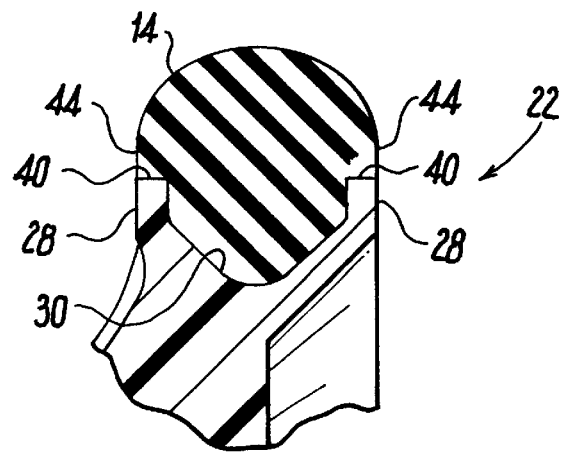
FIG. 7 is an enlarged view of a portion of FIG. 6 showing the placement of the tire on the wheel.

The configuration of a unitary molded tire portion 14 and its integration with the wheel portion 12 can be best seen in FIGS. 6 and 7, and as such will be discussed with reference thereto. In one embodiment, the tire portion 14 is molded from a second material, such as polyvinylchloride, onto the circumferential rim 22 of the wheel portion 12. When the second material is molten, it enters and completely fills and engages the radially outwardly opening annular channel 32 in the circumferential rim 22 completely fills and engages each of the tabs 36. The first material forming the wheel and the second material forming the rim are preferably mutually adhesively compatible without intervention of glutinous substances, so that when the second material has hardened, the tire portion 14 becomes unitary and inseparable from the wheel portion 12 without wheel structure destruction. As seen, the tire 14 is molded in a conventional shape having a tread surface and tire side walls 44. The tire has a sufficiently wide cross sections so that the side walls 44 extend over and abut the shoulders 40 of the side walls 28 of the circumferential rim.

A premolded solid tire, separately formed, can be installed within the annular channel, by manual means using a limited number of tools. similarly, a pneumatic tire may be employed. In any event, the premolded tire will have the same configuration as the tire 14 shown.

The tire portion 14 extends from the annular peripheral wall 30 of the circumferential rim 22 in a convex manner from side wall to side wall of the pair of side walls 28 of the circumferential rim 22, with the shoulders 40 absorbing loads imparted on the tire portion 14, at its outer edges.

It will be understood that each of the elements described above, or two or more together, may also find a useful application in other types of constructions differing from the types described above.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A unitary wheel assembly for a wheelchair having an axle, comprising:
   an integral molding of a plastic first material comprising a hub for rotative mounting to the axle of the wheelchair, a plurality of spokes extending at their innermost ends radially outwardly from said hub, a circumferential tire rim connecting said plurality of spokes at their outermost ends; said circumferential tire rim having a radially outwardly opening annular channel extending completely therearound for holding a tire, and a hand push ring molded with each of said spokes and spaced from and laterally offset from said tire rim such that a manual rotational force exerted on said push ring is exerted through said spokes directly to said hub.

2. The assembly as defined in claim 1, wherein a plurality of radially outward tabs are formed with said circumferential tire rim, said tabs being spaced about the periphery of said rim aligned for directing forces exerted on the tire to the spokes.

3. The assembly as defined in claims 1 or 2, wherein a second material molded in the form of a tire is installed onto said circumferential tire rim.

4. The assembly according to claim 2, wherein said formed tire is molded, during manufacture, integrally with said wheel and when said second material is molten, entering and completely filling and engaging said radially outwardly opening annular channel in said circumferential tire rim and entering and completely engaging and encasing said plurality of spaced-apart tabs in said radially outwardly opening annular channel in said circumferential rim, and when said second material has hardened, said formed tire being unitary and inseparable from said wheel without wheel structure destruction.

5. The assembly as defined in claim 1, wherein said first material is nylon with 14% glass fiber reinforced with a maximum of 22% regrind, and said second material is polyvinylchloride.

6. The assembly as defined in claim 1, wherein said circumferential tire rim comprises a pair of sides walls that are parallel, spaced-apart, and annular, and connected to each other by an annular peripheral wall, and have a central plane equidistant therebetween for providing more surface area and a deep seat for said tire.

7. The assembly as defined in claim 6, wherein said radially outwardly opening annular channel in said circumferential rim is substantially V-shaped in profile and has legs that are connected to each other by a concave portion so as to reduce stress thereat and provide more surface area for said tire portion, with said concave portion of said radially outwardly opening annular channel in said circumferential rim being disposed on said central plane and with said legs of said radially outwardly opening annular channel in said circumferential rim extending radially divergingly outwardly therefrom to short of said annular peripheral wall of said circumferential rim and then parallel to said pair of side walls of said circumferential rim to, and opening into, said annular peripheral wall of said circumferential rim so as to form shoulders therewith.

8. The assembly as defined in claim 7, wherein each tab of said plurality of spaced-apart tabs is flat, thin, and substantially rectangular shaped and extends radially outwardly from said concave portion of said radially outwardly opening annular channel in said circumferential rim, in radial alignment with an associated spoke of said plurality of spokes, past said annular peripheral wall of said circumferential rim and circumferentially slightly past opposing sides of said associated spoke of said plurality of spokes so as to have loads imparted thereon transferred to said associated spoke of said plurality of spokes, with said throughbores in said plurality of spaced-apart tabs being oblong-shaped to facilitate molding and eliminate sharp corners from cutting into said tire portion.

9. The assembly as defined in claim 6, wherein said tire portion further extends from said annular peripheral wall of said circumferential rim in a convex manner from side wall to side wall of said pair of side walls of said circumferential rim, with said shoulders absorbing loads imparted on said tire portion, at its outer edges.

10. A unitary wheel and tire assembly for a wheelchair having an axle, comprising:
   (a) a wheel portion being molded from a first material and having a hub for rotative mounting to the axle of the wheelchair, a plurality of spokes extending at their innermost ends radially outwardly from said hub, and a circumferential rim connecting said plurality of spokes at their outermost ends; said circumferential tire rim having a radially outwardly opening annular channel extending therearound for holding a tire with a plurality of spaced-apart tabs extending radially outwardly therefrom for directing forces exerted on the tire to the spokes; and (b) said tire molded from a second material onto said circumferential tire rim of said wheel portion and entering and completely filling and engaging said radially outwardly opening annular channel in said circumferential tire rim and completely engaging and encasing said plurality of spaced-apart tabs in said radially outwardly opening annular channel in said circumferential rim so as to allow said tire portion to be unitary and inseparable from said wheel portion without wheel structure destruction.

11. The assembly as defined in claim 10, wherein said wheel portion and said tire portion are injection molded, with said wheel portion being annealed and moisture conditioned after molding.

12. A unitary wheel and tire assembly for a wheelchair having an axle, comprising:

(a) a wheel portion being molded from a first material and having a hub for rotative mounting to the axle of the wheelchair, a plurality of spokes extending at their innermost ends radially outwardly from said hub, and a circumferential rim connecting said plurality of spokes at their outermost ends; said circumferential tire rim having a radially outwardly opening annular channel extending therearound for holding a tire with a plurality of spaced-apart tabs extending radially outwardly therefrom for directing forces exerted on the tire to the spokes; and (b) said tire molded from a second material onto said circumferential tire rim of said wheel portion and entering and completely filling and engaging said radially outwardly opening annular channel in said circumferential tire rim and completely engaging and encasing said plurality of spaced-apart tabs in said radially outwardly opening annular channel in said circumferential rim so as to allow said tire portion to be unitary and inseparable from said wheel portion without wheel structure destruction, wherein said wheel portion further comprises a hollow push ring spaced from, and molded with, said plurality of spokes.

13. The assembly as defined in claim 10, wherein said circumferential rim comprises a pair of sides walls that are parallel, spaced-apart, and annular, and connected to each other by an annular peripheral wall, and have a central plane equidistant therebetween.

14. The assembly as defined in claim 13, wherein said radially outwardly opening annular channel in said circumferential rim is substantially V-shaped in profile and has legs that are connected to each other by a concave portion so as to reduce stress thereat and provide more surface area for said tire portion, with said concave portion of said radially outwardly opening annular channel in said circumferential rim being disposed on said central plane and with said legs of said radially outwardly opening annular channel in said circumferential rim extending radially divergingly outwardly therefrom to short of said annular peripheral wall of said circumferential rim and then parallel to said pair of side walls of said circumferential rim to, and opening into, said annular peripheral wall of said circumferential rim so as to form shoulders therewith.

15. The assembly as defined in claim 12, wherein said circumferential rim comprises a pair of sides walls that are parallel, spaced-apart, and annular, and connected to each other by an annular peripheral wall, and have a central plane equidistant therebetween, wherein said circumferential rim comprises a pair of sides walls that are parallel, spaced-apart, and annular, and connected to each other by an annular peripheral wall, and have a central plane equidistant therebetween, wherein each tab of said plurality of spaced-apart tabs is flat, thin, and substantially rectangular shaped and extends radially outwardly from said concave portion of said radially outwardly opening annular channel in said circumferential rim, in radial alignment with an associated spoke of said plurality of spokes, past said annular peripheral wall of said circumferential rim and circumferentially slightly past opposing sides of said associated spoke of said plurality of spokes so as to have loads imparted thereon transferred to said associated spoke of said plurality of spokes.

16. A method making a unitary wheel and tire assembly for a wheelchair having an axle, comprising the steps of:

molding a wheel portion from a first material to form a hub for rotative mounting to the axle of the wheelchair, a plurality of spokes extending at their innermost ends radially outwardly from said hub, and a circumferential rim connecting said plurality of spokes at their outermost ends, with said circumferential rim being formed with a radially outwardly opening annular channel extending completely therearound with a plurality of spaced-apart tabs extending for directing forces exerted on the tabs to the spokes.

17. The method according to claim 16, including the step of molding the tire onto said circumferential rim of said wheel portion, and when said second material is molten, entering and completely filling and engaging said radially outwardly opening annular channel in said circumferential rim and completely engaging and encasing said plurality of spaced-apart tabs in said radially outwardly opening annular channel in said circumferential rim, and when said second material has hardened, said tire portion being unitary and inseparable from said wheel portion without wheel destruction.

18. The method as defined in claim 17, wherein said first material and said second material are selected to be mutually adhesively compatible without intervention of glutinous substances.

19. The method as defined in claim 17; further comprising the steps of annealing and moisture conditioning said wheel portion after said molding step.

20. A method of making a unitary wheel and tire assembly for a wheelchair having an axle, comprising the steps of:

molding a wheel portion from a first material to form a hub for rotative mounting to the axle of the wheelchair, a plurality of spokes extending at their innermost ends radially outwardly from said hub, and a circumferential rim connecting said plurality of spokes at their outermost ends, with said circumferential rim being formed with a radially outwardly opening annular channel extending completely therearound with a plurality of spaced-apart tabs extending radially outwardly therefrom for directing forces exerted on the tabs to the spokes, wherein said circumferential rim comprises a pair of sides walls that are parallel, spaced-apart, and annular, and connected to each other by an annular peripheral wall, and have a central plane equidistant therebetween forming said wheel portion with a hollow push ring spaced from, and integrally molded with, said plurality of spokes.

21. The method as defined in claim 20, wherein said first material and said second material are selected to be mutually adhesively compatible without intervention of glutinous substances, wherein each tab of said plurality of spaced-apart tabs is formed to be flat, thin, and substantially rectangular sapped and to extend radially outwardly from said concave portion of said radially outwardly opening annular channel in said circumferential rim, in radial alignment with an associated spoke of said plurality of spokes, past said annular peripheral wall of said circumferential rim and circumferentially slightly past opposing sides of said associated spoke of said plurality of spokes so as to have load imparted thereon transferred to said associated spoke of said plurality of spokes.

* * * * *